United States Patent
Davis et al.

(10) Patent No.: US 10,607,174 B2
(45) Date of Patent: Mar. 31, 2020

(54) PROACTIVE SIMULATION AND DETECTION OF OUTBREAKS BASED ON PRODUCT DATA

(71) Applicant: International Business Machines Corporation, Armonk, NY (US)

(72) Inventors: Matthew Aaron Davis, San Jose, CA (US); Stefan Bengt Edlund, San Jose, CA (US); Hu Kun, San Jose, CA (US); James H. Kaufman, San Jose, CA (US); Sondra Ronee Renly, Elmsford, NY (US); Daniel Dörr, Ravensberger (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/914,039

(22) Filed: Jun. 10, 2013

(65) Prior Publication Data
US 2014/0365270 A1  Dec. 11, 2014

(51) Int. Cl.
*G06Q 10/06* (2012.01)

(52) U.S. Cl.
CPC ................ *G06Q 10/0635* (2013.01)

(58) Field of Classification Search
None
See application file for complete search history.

(56) References Cited

U.S. PATENT DOCUMENTS

| | | | |
|---|---|---|---|
| 2003/0018595 A1* | 1/2003 | Chen | G06N 20/00 706/12 |
| 2004/0152056 A1* | 8/2004 | Lamb | G09B 23/28 434/219 |
| 2005/0131723 A1* | 6/2005 | Sholl | G06Q 10/06 705/1.1 |
| 2008/0288417 A1* | 11/2008 | Luessi | G06Q 40/06 705/36 R |
| 2009/0043606 A1* | 2/2009 | Underwood | G06Q 40/06 705/2 |

(Continued)

Primary Examiner — Alan S Miller
Assistant Examiner — Arif Ullah
(74) Attorney, Agent, or Firm — Erik Huestis; Stephen Kenny; Foley Hoag LLP

(57) ABSTRACT

Embodiments of the present invention relate to proactive computer simulation of portable product failures, and more specifically, to determining the likely cause of an outbreak of foodborne disease or other geographically distributed symptoms of a failure or contamination of a portable product. In one embodiment, a method of and computer program product for simulating portable product failures is provided. Data regarding the locations of consumers of a portable product within a geographic region is received from a data store. A probability density map is determined from the data, indicating where the portable product is likely to be consumed within the geographical region. For each of a plurality of simulated failures of the portable product, the locations of a plurality of simulated incidents arising from the simulated failure are determined. From the locations of the plurality of simulated incidents and the probability density map, the number of incidents necessary to identify the portable product to a predetermined certainty is determined.

12 Claims, 5 Drawing Sheets

(56) References Cited

U.S. PATENT DOCUMENTS

2010/0161376 A1\* 6/2010 Spagnolo ............... G06Q 10/00
                                                      705/7.34
2010/0198635 A1\* 8/2010 Pirtle .................... G06Q 10/04
                                                      705/7.41

\* cited by examiner

200

201

300

302 — 301

PROACTIVE SIMULATION AND DETECTION OF OUTBREAKS BASED ON PRODUCT DATA

BACKGROUND

Embodiments of the present invention relate to proactive computer simulation of portable product failures, and more specifically, to determining the likely cause of an outbreak of foodborne disease or other geographically distributed symptoms of a failure or contamination of a portable product.

BRIEF SUMMARY

According to one embodiment of the present invention, a method of and computer program product for simulating portable product failures is provided. Data regarding the locations of consumers of a portable product within a geographic region is received from a data store. A probability density map is determined from the data, indicating where the portable product is likely to be consumed within the geographical region. For each of a plurality of simulated failures of the portable product, the locations of a plurality of simulated incidents arising from the simulated failure are determined. From the locations of the plurality of simulated incidents and the probability density map, the number of incidents necessary to identify the portable product to a predetermined certainty is determined.

According to another embodiment of the present invention, a method of and computer program product for simulating portable product failures is provided. Data regarding the locations of sales of a portable product within a geographic region is received from a data store. The locations of consumers of a portable product within a geographic region are determined based on the locations of sales. A probability density map is determined from the data, indicating where the portable product is likely to be consumed within the geographical region. For each of a plurality of simulated failures of the portable product, the locations of a plurality of simulated incidents arising from the simulated failure are determined. From the locations of the plurality of simulated incidents and the probability density map, the number of incidents necessary to identify the portable product to a predetermined certainty is determined.

DETAILED DESCRIPTION

Figure 1:
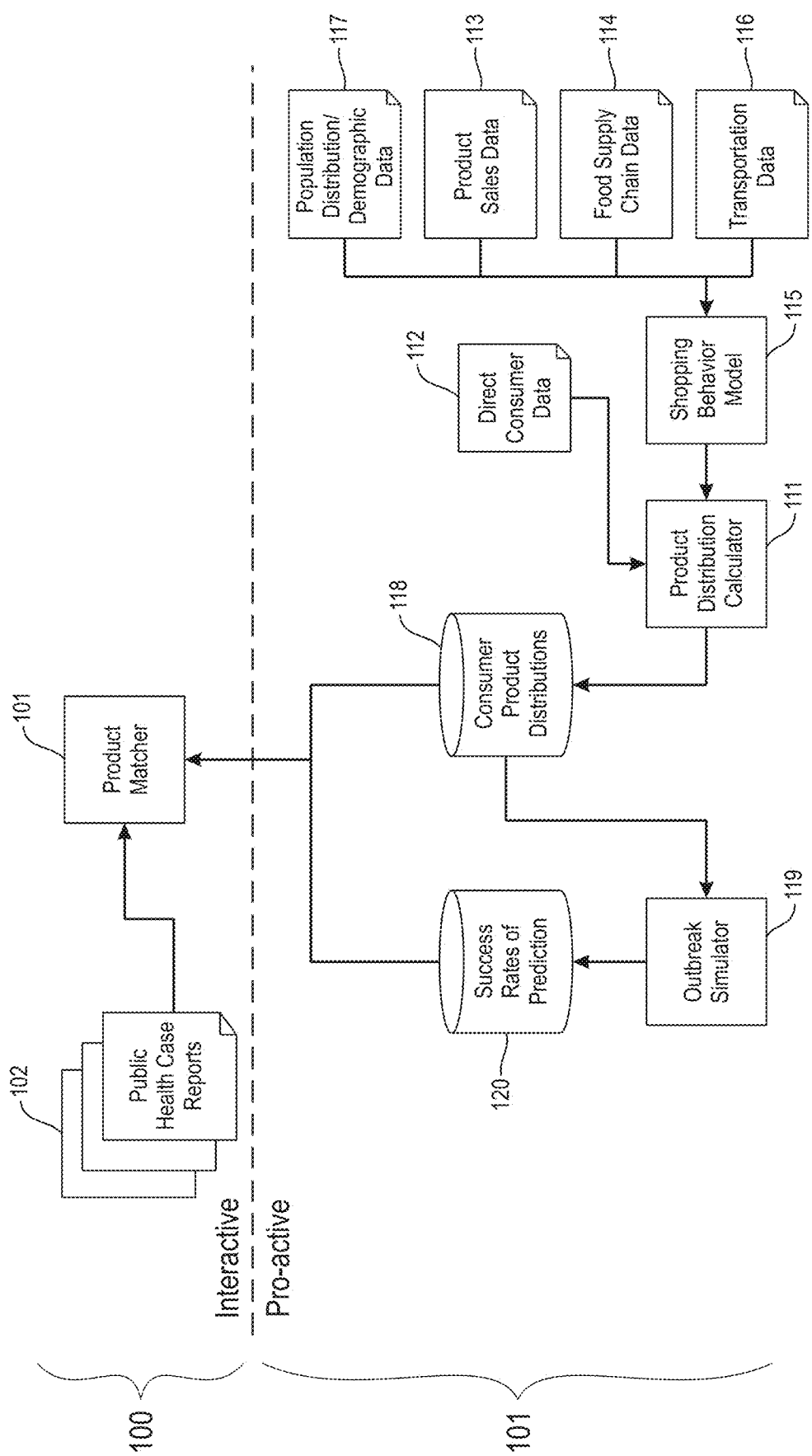
FIG. 1 is a schematic representation of a system according to an embodiment of the present disclosure.

Food safety procedures, such as recommendations published by the FDA, are critical to reducing foodborne illness. However it has not been possible to completely eliminate the risk of receiving contaminated food. When prevention efforts fail, rapid identification of the source product is essential. The medical and economic losses incurred increase with the duration of an outbreak. Using conventional approaches to identify the contaminated product, public health investigators reconstruct the relevant food distribution network. The time required for such an investigation ranges from days to weeks. Accelerating this process would reduce the number of people sickened and restore consumer confidence in our food and public health food safety response systems. As an example, in a 2011 EHEC outbreak in Germany it took 45 days to issue a warning suspecting raw sprouts and over 60 days until the contaminated sprouts were confirmed. During this time all of the contaminated sprouts had been consumed.

Reducing the time between the first reported case of illness and confirmation of the contaminated food is critical. In addition to the human tragedy of illness and death, the financial burden is significant. Every fatal case of *E. coli* is estimated to cost seven million dollars. In the United States alone, 128,000 people are hospitalized and 3,000 people die each year from foodborne illness. Furthermore, retailers and distributors lose billions of dollars when food products rot in the fields or are thrown away due to a sharp drop in sales due to consumer uncertainty during an outbreak before the cause is confirmed. Hence, from a retailer perspective there is a strong desire to quickly determine whether one of their products is a likely source in a foodborne disease outbreak.

Accordingly, the present disclosure provides systems and methods for pro-active analysis of spatiotemporal attributes in supply chains, food sales data, food distributions, customer shopping behavior, and public health case reports to accelerate the investigation of a foodborne disease outbreak. Investigation of a particular food borne disease outbreak begins once a series of clinical laboratory, public health laboratory, or public health case reports have been linked. Suspect or confirmed laboratory and case reports are geocoded to the patient's home (or location of consumption) and provide a time window for investigation based on when clinical presentation of symptoms started and treatment was sought. The present disclosure provides a set of techniques to use these linked laboratory and case reports to accelerate the identification of the contaminated product.

Although various examples herein refer to food distribution and outbreaks of food-borne illness, the techniques described are not limited to outbreaks of food-borne disease. They are generally applicable to cases in which portable goods, whether food, pharmaceuticals, or other consumer goods fail or are otherwise compromised, resulting in an injury. For example, food products, pharmaceuticals, medical devices, cosmetics, personal care products, food handling products, and pet care products are susceptible to contamination, spoilage, or manufacturing failure leading to illness. Application areas generally include scenarios in which information regarding a resulting injury is available (e.g., a public health report or an accident report), but the source of the injury is not immediately obvious or discoverable. In these cases, the systems and methods of the present disclosure may be applied to the relevant supply chain using information about product sales or transfers and a set of possible product failures. For example, failures of electronic components, resulting in a fire, may be analyzed as set forth below.

A broad range of product failures in consumable goods may be analyzed using the systems and methods detailed below. Consequently, the term "outbreak" is used broadly to include any pattern of geographically distributed incidents, including but not limited to an outbreak of food-borne illness. For example, a consumable good may fail by spoilage at any one of several stages of the supply chain. Spoilage may arise as a result of failure of refrigeration in a production facility, a transport container on a truck or boat, or a retailer. Spoilage may arise because of unforeseen delays in delivery of a perishable product, or retention of a perishable product at a retailer beyond the safe consumption date. A consumable good may also fail due to contamination. Contamination may arise as a result of introduction of a pathogen, a heavy metal, or another contaminant. Contamination, like spoilage, may arise during production, transport, storage, or at the point of sale. Both contamination and spoilage may arise once a product is in the hands of a consumer. Certain types of spoilage and contamination increase in frequency with the time since production. For example, perishable foods are more likely to spoil the greater the elapsed time since production, irrespective of contamination. Similarly, contamination may be more likely to arise once a product is in the hands of a retailer or consumer rather than a producer. Local factors may contribute to rates of failure among certain products. For example, certain products spoil faster in the summer months than in the winter months.

As set forth in further detail below, systems and methods are provided for proactively computing the spatiotemporal distributions describing consumption of food or other consumable goods within a population based on available inventory sales data. This is done on an ongoing basis in advance of an outbreak. Using the spatiotemporal distributions of product consumption, a plurality of outbreak scenarios is simulated. The simulated outbreak scenarios may number in the hundreds or thousands. Based on the results of these simulated outbreaks, the number of case reports necessary to identify the product responsible for an outbreak is determined given a predetermined confidence level.

In addition, systems and methods are provided for real time prediction of an outbreak. The spatial and temporal distribution of laboratory and case reports is compared with the spatiotemporal distributions describing consumption of products and with the simulated outbreaks to determine the probabilities that various products are responsible for the outbreak. Supply chain profiling is applied to further refine the outbreak analysis. Further information about where in a supply chain a particular outbreak has occurred is determined by joining together distributions based on common products (e.g., foods) sold by different vendors, and splitting apart distributions based on different processing facilities for the same product.

With reference now to FIG. 1, an overview of an embodiment of the invention is provided. The system may be divided into two operational components. Interactive component 100 is operates in real-time during an actual outbreak or retrospectively to review day-by-day historical outbreak data. Proactive component 101 operates in advance of an outbreak to continuously create thousands of time window food distribution signatures before the outbreak occurs.

Within proactive component 101, Product Distribution Calculator 111, builds a geospatial map of product distribution. The map is a 2-dimensional probability density function where each point on the map indicates the probability a given product (e.g., a particular food item) is being consumed at that location during a predetermined window of time. Product Distribution Calculator 111 computes this for each product being monitored. To compute the probability, the system leverages one or more data sources.

Direct Customer Data 112 provides detailed and location-specific data to Product Distribution Calculator 111. Direct Customer Data 112 may be a data store such as a database or flat file containing the current address (e.g., home, work) of consumers together with the products that they purchased. Retail stores collect this information via club membership cards and credit card purchases. However, this data is not always available or correct, so Product Distribution Calculator 111 may supplement Direct Customer Data 112 with food product sales data 113 registered at stores. Additionally, Product Distribution Calculator 111 may use data from supply chain sources 114. However, as this data is collected further away from the customer, store location, and time sold, it is less accurate for creating unique time sensitive distribution signatures estimating consumer product density.

Customer shopping behavior model 115 may estimate where products are likely to be consumed based on product sales data 113 or supply chain sources 114. In some embodiments, customer shopping behavior model 115 comprises a gravity model. In general, a gravity model provides that the farther away from a store a customer lives, the less likely she is to shop there. In some embodiments, the gravity model is a Huff gravity model. The accuracy of shopping behavior model 115 may be increased further by taking into account the accessibility of stores by incorporating transportation data 116 (e.g., roads or public transportation options), employment centers, and population demographic information 117 (i.e., education, income level, family structure), as well as seasonal variations (e.g. holidays).

Product Distribution Calculator 111 may also use a shopping behavior model to produce distributions that takes into account customer travel to and from retail stores. The output of Product Distribution Calculator 111 is a 2-dimensional product probability density function for each product being monitored during a window of time. This data is stored in the Product Distributions database 118.

Figure 2:
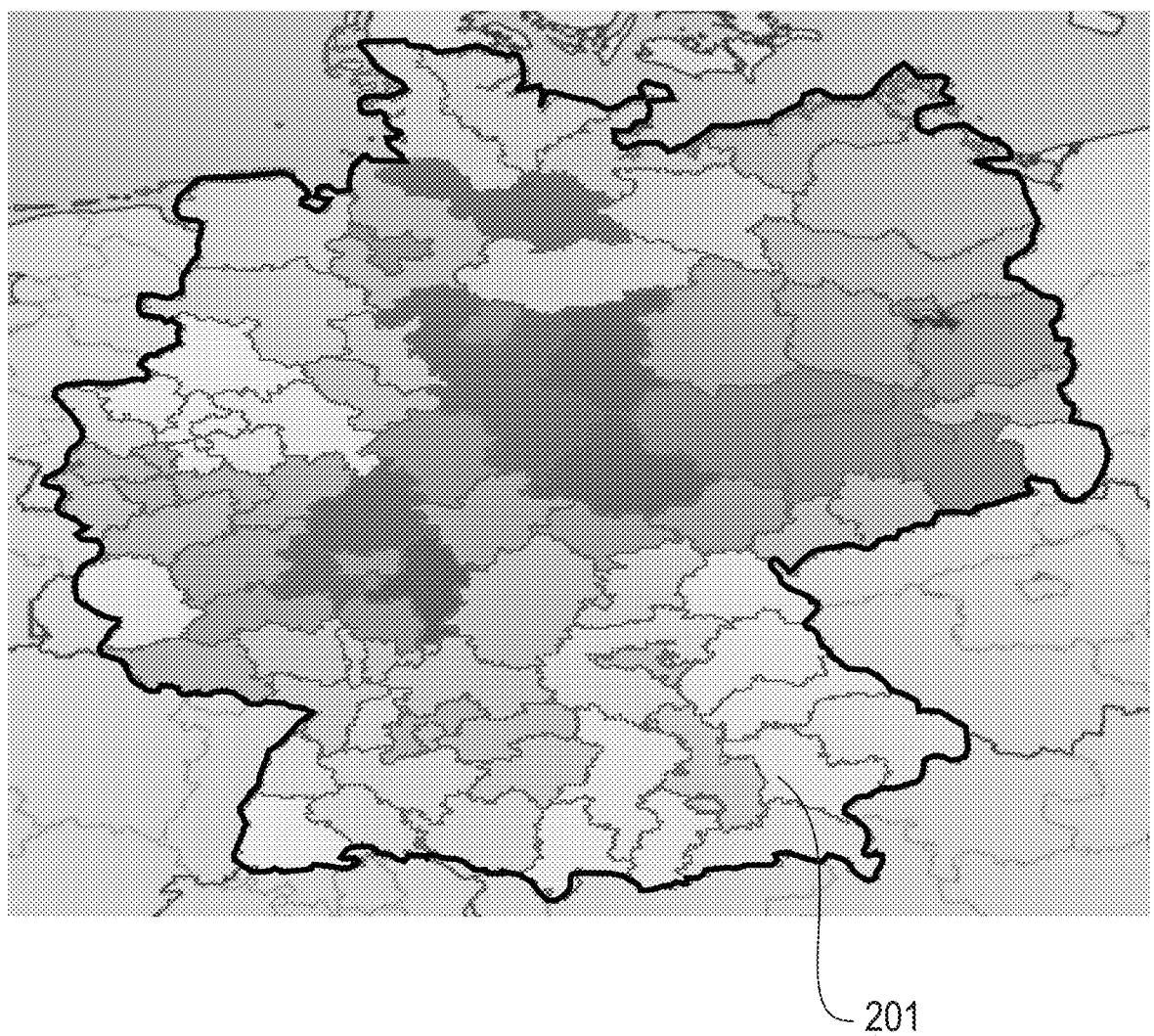
FIG. 2 depicts exemplary output of a product distribution calculator according to an embodiment of the present disclosure.

Exemplary output data of Product Distribution Calculator 111 is shown in FIG. 2. Map 200 depicts the outline of a geographic region 201. The area within geographic region 201 is shaded according to the probability that a given product is being consumed during a given window of time. A plurality of such maps is generated by Distribution Calculator 111, one for each item of interest for each time window of interest. Although shown as a visual map, the output of Distribution Calculator 111 may be in the form of a matrix, a probability density function, or any other representation that ties probabilities to an underlying geographic region.

Proactive component 101 also includes Outbreak Simulator 119. For each product being monitored, Outbreak Simulator 119 simulates hundreds or thousands of outbreaks that cover different product failure scenarios (e.g., for food contamination scenarios, at one store or at one distributor for multiple stores). By sampling from the product distribution for the product in question, synthetic case reports are generated. The simulated product failures are based both on the known spatial distribution of product sales, and also based on the time of distribution. The duration of an outbreak (the number of failures over a period of time) may be varied based on a known shelf life of a product, known life-cycles of harmful organisms or contaminants, and other temporal factors related to the effects of a failure. Outbreak Simulator 119 also models delays, or latency, between the sale of a product and the reports of failure based on known incubation periods for harmful organisms. These processes also incorporates realistic noise to include case reports showing up far from where products are being sold, for instance by transient customers happening to travel through a town and stopping to shop. Next, Outbreak Simulator 119 takes the geo-coded synthetic case reports and looks at each product to determine the probability that the product was consumed at the home location indicated in the case report. The result is a sorted list of potential contaminated products with the most likely at the top. Outbreak Simulator 119 does this by looking at either the distribution of all products together (in which case the source of the outbreak won't be identified), or by looking at individual distributions from product sales of particular distributors across multiple stores. The latter analysis can give hints about the source of an outbreak. In some embodiments, Outbreak Simulator 119 ranks products according to their probability of contamination using the Maximum Likelihood method.

After ranking, Outbreak Simulator 119 generates a new synthetic case report, and recalculates the product probabilities. The new probabilities are aggregated to come up with a refined list, and the process is repeated up to a maximum target number of case reports (e.g., 100). For each synthetic case report, the Outbreak Simulator 119 picks the most likely product from the list and compares it to the correct contaminated product from the simulated scenario. If they are the same, the Outbreak Simulator 119 increases a success counter associated with the number of case reports analyzed so far. Using the output from this process, Outbreak Simulator 119 learns which products have very similar distribution patterns and are difficult to disambiguate. Similar products are grouped into a smaller group and Outbreak Simulator 119 re-runs the simulations to create a success counter for the entire group.

Outbreak Simulator 119 repeats the above described process for hundreds or thousands of simulations, and obtains a success rate after each successive case report (by dividing the success counter by the total number of simulations run). The resulting data is inserted into the Product Success Rate database 120. For each monitored product or group, database 120 contains a list of the number of case reports (e.g., 1-100) and the success rate associated with that number of case reports from the synthetic outbreak runs of Outbreak Simulator 119. In this way the system detects and measures, prior to a real outbreak, the ability to discriminate between products. The data allows the system to identify those products and product groups that require few case reports to determine contamination and those products for which discrimination is more difficult. In the latter case a larger subset of food products should be tested when a potential outbreak occurs.

By performing this pro-active analysis and modeling, Outbreak Simulator 119 identifies those products that will be more difficult to identify should an outbreak occur due to contamination in the product. For example, two different products with nearly identical space/time sales characteristics will be hard to resolve. Understanding this in advance of an outbreak, the probability distributions for a set of products can be combined or joined to test for and confirm contamination within a finite set, thereby reducing the problem of lab testing to testing just a restricted set of products. This does not rule out analyzing the original unjoined distributions. However, it adds the ability to group products that are known to be high risk but sold based on a common pattern.

Figure 3:
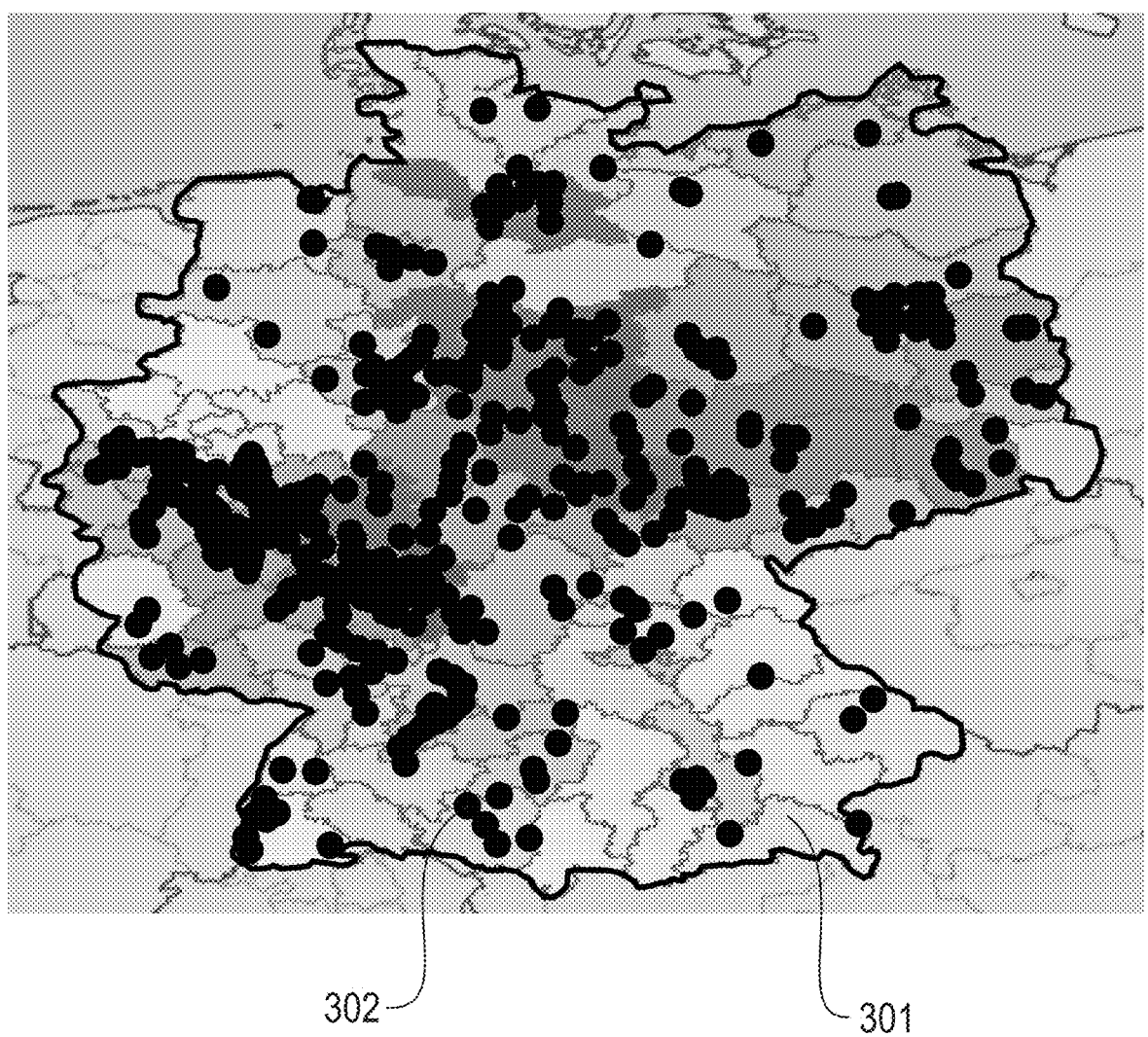
FIG. 3 depicts exemplary output of an outbreak simulator according to an embodiment of the present disclosure.

Exemplary output data of Outbreak Simulator 119 is shown in FIG. 3. Map 300 depicts the outline of a geographic region 301. Geographic region 301 includes circles 302, which signify the geographical locations of incidents (e.g., illnesses constituting an outbreak). A plurality of such maps is generated by Outbreak Simulator 119, one for each potential failure (e.g., contamination at a given point in the supply chain) and each potential time window of interest. Although shown as a visual map, the output of Outbreak Simulator 119 may be in the form of a matrix, a list of coordinates and times, or any other representation that ties incidents to an underlying geographic region and a time of occurrence.

Interactive component 100 includes Product Matcher 101. Product Matcher 101 works with real-time data to help quickly identify potentially contaminated products during actual outbreaks. Product Matcher 101 receives real-time case reports 102. In some embodiments, these reports are supplied through public health organizations. In some embodiments, these reports are medical reports or laboratory reports. Product Matcher 101 applies the same method described above with regard to Outbreak Simulator 119 to compute the probability that each product is the source of contamination based on the geocoded information in the case report 102. In some embodiments, Product Matcher 101 ranks products using the Maximum Likelihood method. Product Matcher 101 outputs an ordered list of products sorted by the product's contamination probability. As new real-time case reports 102 are received by Product Matcher 101, the contamination probabilities list is updated. As noted above, this analysis may be performed for all products grouped together, or only for products from particular distributors.

Figure 4:
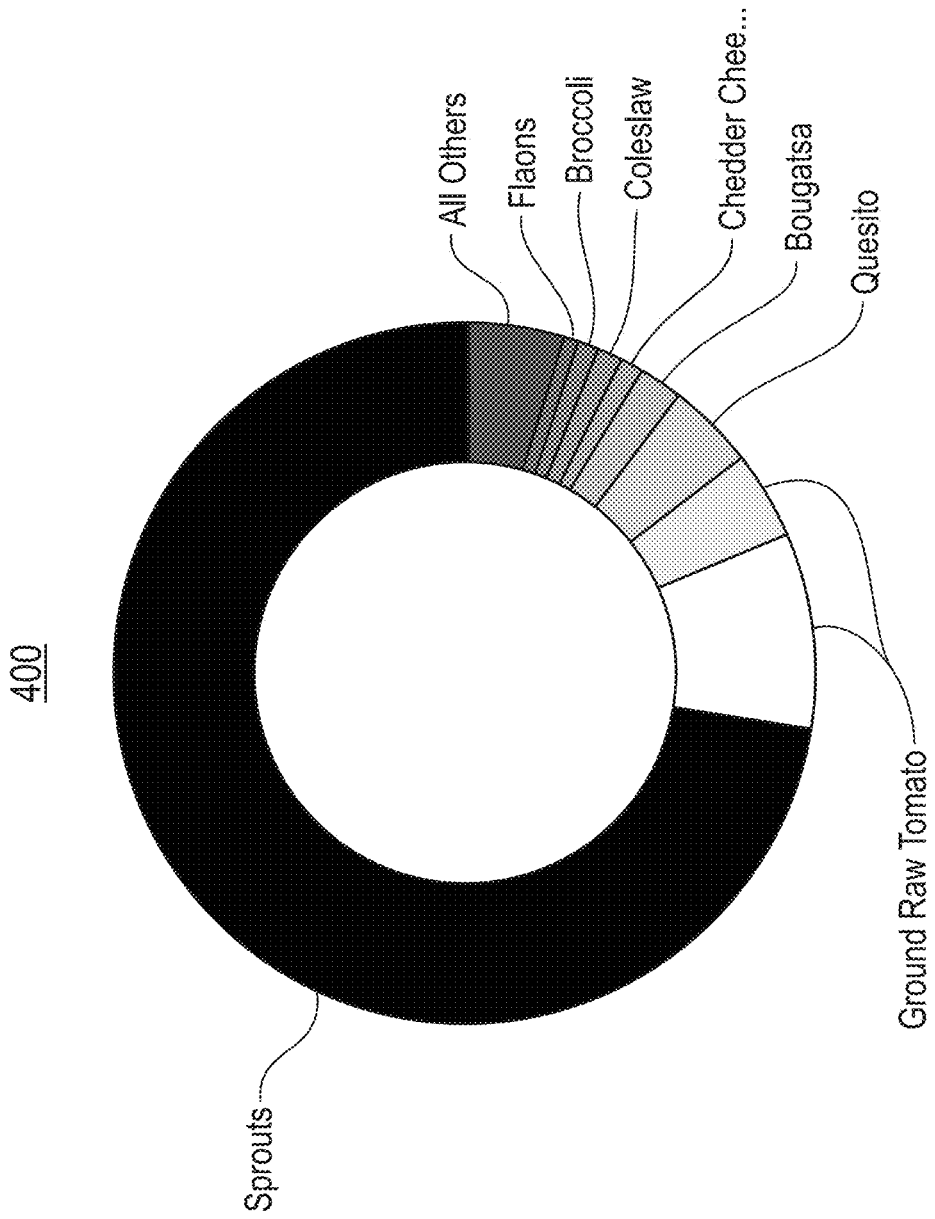
FIG. 4 depicts exemplary output for a product matcher according to an embodiment of the present disclosure.

FIG. 4 shows an exemplary visualization of the output of Product Matcher 101. Wheel chart 400 includes a region for each suspect food product, each region being sized according to the relative probability that each product is the source of the outbreak. Before an investigation of suspect products is undertaken, the success rates previously generated by Outbreak Simulator 119 for the most probable product are consulted. In particular, the number of linked case reports 102 is determined. The success rate for the most likely product identified by Product Matcher 101 given the number of linked case reports is determined from database 120. If the success rate for this product given the number of linked case reports is less than a predetermined threshold (e.g., 80%), the investigator most likely needs to wait for more cases before investing time and money investigating the product. However, if the success rate is above the predetermined threshold, the investigator may take action. Typically, more than one product is suspect and Product Matcher 101 provides the top potentially contaminated candidate products for officials to consider. In some embodiments, the system retrieves the top n products sorted by their probability of contamination and returns to the investigator the subset of those products that also exceeds a predetermined success rate threshold given the number of case reports available.

Various other methods known in the art may be applied to determine the list of top products warranting further investigation. In some embodiments, the rankings are based on the probabilities calculated by Product Matcher 101 in combination with the success rates calculated by Outbreak Simulator 119 and stored in database 120. Parameters such as threshold values and product cut-off may be optimized by training the system against actual historical outbreak data, if available, and using domain expertise to tune the system by outbreak features such as food type, etiological agent involved, seriousness of illness, and other factors relevant to the applicable field.

Large retailers and distributors routinely collect data suitable for proactive computation of product sales distributions. Sharing this data, (e.g., through an online service or an industry consortium agreement), allows pre-computation of sale distributions across products and different retail brands (e.g., throughout a supermarket chain). Thus, customer data 112 may reside in a remote database, a cloud storage, or other datastore suitable for storage and retrieval of large amounts of data by a range of parties. In some cases, multiple retailers sell the same product. These distributions may be combined into a joint distribution used to detect contamination at the distributor or point of production. Contamination in a specific retail location (e.g., in the local butcher operation) is detected by applying the algorithm to distributions derived from individual retailers (brands) or even individual stores. Proactive analysis may pre-calculate all distributions, both combining stores and brands and keeping them separate. By comparing outbreak case reports to all distributions, the output Product Matcher 101 may identify both the most likely contaminated product(s) and the point in the supply chain where the contamination is most likely to have taken place.

Organisms and toxins that cause foodborne illness have well known incubation periods, the average time between consumption of a contaminated food and occurrence of clinical symptoms. This latency varies from hours to several weeks, depending on the contamination. For this reason, Product Distribution Calculator 111 takes advantage of product delivery dates, sale dates, and expiration dates when available. The proactively computed distributions of product sales may comprise separate distributions computed based on sales within a moving time window. For example, when the etiological entity is a non-typhoidal *Salmonella* bacterium, it has a typical incubation period of 2 days, with a maximum of 10 days. In sales of non-frozen fish products, the fish is generally sold within 2 days of store delivery or discarded. By aggregating food distribution data over a time period (e.g., one week, two weeks, three weeks, etc.) the Product Distribution Calculator 111 can take advantage of these latencies to bound the inherent distribution properties and improve the predictive capabilities of Outbreak Simulator 119. This additional data assists in identifying the most likely product as well as one or more product deliveries. Multiple distributions derived from the sale of each product may be pre-calculated using time windows with multiple durations and with multiple time delays. This also ensures that the algorithm works for products that are produced and sold only seasonally.

Figure 5:
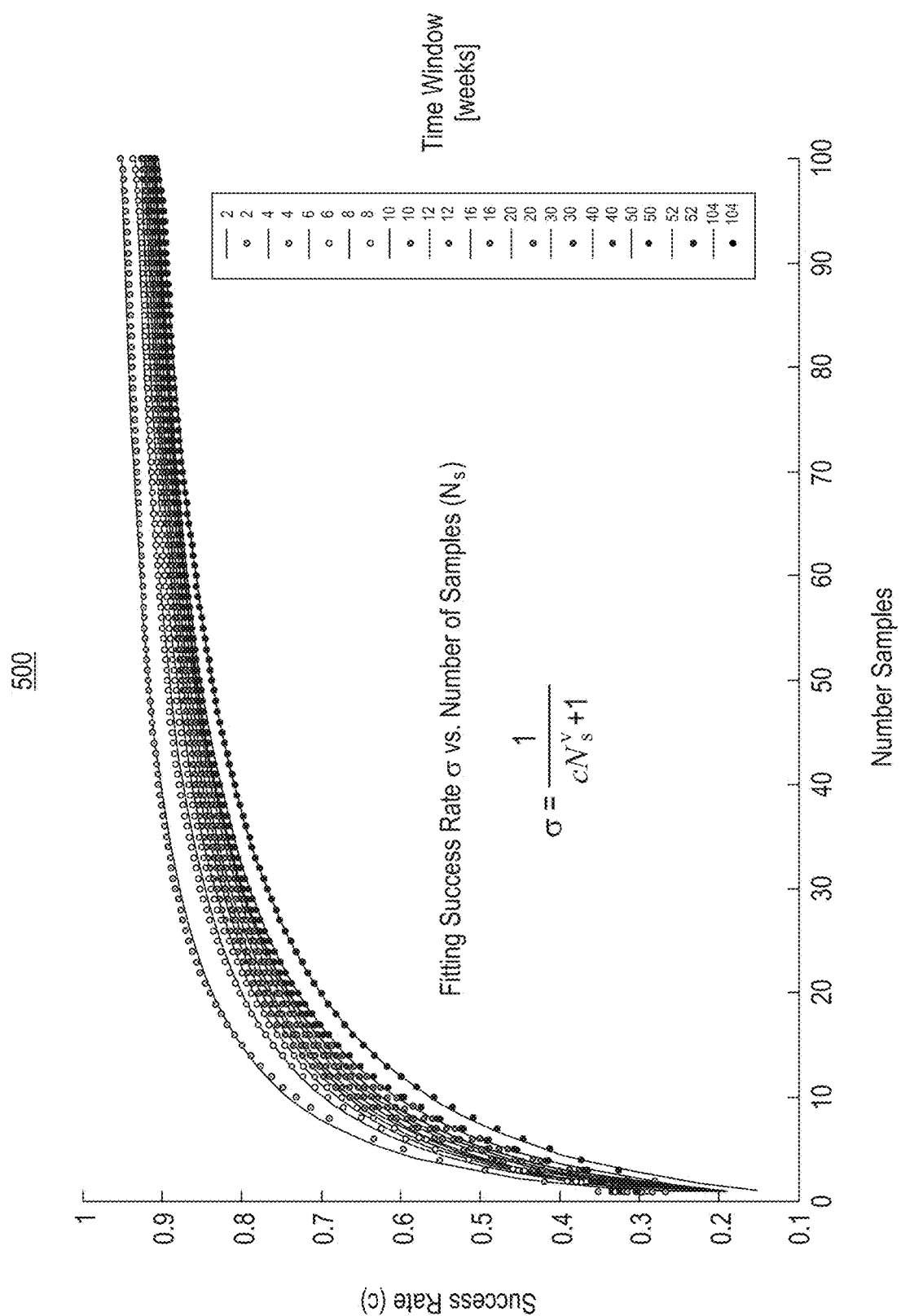
FIG. 5 depicts fitting success rate relative to number of samples and time window duration according to an embodiment of the present disclosure.

FIG. 5 shows a plot of the fitting success rate (c) of Outbreak Simulator 119 σ vs. the number of samples ($N_s$) for various time windows, where $$\sigma = \frac{1}{cN_s^v + 1}.$$

Time windows ranging from 2 to 104 weeks are plotted.

Restaurants and delis account for 48% of reported outbreaks of foodborne illness where a single setting was identified. For this reason, food sales from retailers to restaurants are as important as customer sales. By tracking sales from retailers to restaurants proactively, outbreaks that first show up in a restaurant may rapidly be connected to retailers up the supply chain.

The system of the present disclosure generally relies on the availability and reporting of product sales. However, reported data does not represent all (100%) of the products consumed. For example, in the case of food products, food from a backyard garden is unlikely to ever be tracked. Such missing data does not compromise the efficacy of the systems and methods of the present disclosure. By focusing on the larger retailers and distributions, a significant fraction of products sold and consumed can be analyzed and investigation of the largest outbreaks can be accelerated.

A system according to the present disclosure is useful to retailers in their day-to-day operations. Retailers have a financial incentive to take a proactive approach to food safety, as billions of dollars in revenue are lost annually from the decrease of sales due to recalls and lower consumer confidence following a recall. Large outbreaks that escalate to state or national media have a particularly detrimental effect. Large retailers also have a significant financial incentive to protect the reputation of their store brand products, which are increasingly produced and distributed directly by the retailer.

Additionally, there are advantages for retailers to collaborate and share their data within a service that provides predictive features such as provided in the present disclosure. The predictive capability of the systems of the present disclosure improves as more contaminated products are captured in reported data. A consortium of retail data provides more insight into what shipments are suspect and where contamination has most likely occurred (e.g., at the farm, at a distributor, or at a retail site).

Public health investigators are also in need of improved tooling to accelerate the investigation of foodborne illness. Rapid identification of the food source is essential to removing the contaminated product, to decreasing exposure and illness, to limiting economic damages to retailers, distributors, and farmers, and to restoring consumer confidence in food and public health food safety response systems. Proactive analysis according to embodiments of the present disclosure, performed on an ongoing basis, also provides public health authorities with the ability to do retrospective analysis and follow-up on historical outbreaks to improve future responses and to create new system features. The systems of the present disclosure may thus be used to train the optimization algorithms. Proactive analysis according to embodiments of the present disclosure also provides an advantage to public health authorities by identifying in advance those foods that share similar distributions patterns so that similar products may be analyzed and investigated together. Such investigation may include proactive testing in addition to post-outbreak investigation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving from a data store data regarding locations of consumers of a portable product within a geographic region;
determining a probability density map from the data regarding the locations of consumers, the probability density map indicating where the portable product is likely to be consumed within the geographical region, wherein each point of the map indicates a probability that the portable product is being consumed at that location during a predetermined window of time;
generating a plurality of simulated failures of the portable product based on the probability density map, each simulated failure occurring within a supply chain of the portable product, each failure comprising spoilage or contamination;
for each of the plurality of simulated failures of the portable product, applying a simulator to determining locations of a plurality of simulated incidents arising from each simulated failure, each incident comprising an illness or an injury;

generating, from the locations of the plurality of simulated incidents and the probability density map, a plurality of geocoded synthetic case reports;
determining, for each of the plurality of geocoded synthetic case reports, a ranked list of potential portable products likely to have caused each respective synthetic case report;
comparing a highest ranked potential portable product in each ranked list to the portable product for which the plurality of simulated failures was generated;
when the highest-ranked portable product in a respective ranked list is the same as the portable product, incrementing a counter;
determining a success rate curve based on the counter and the plurality of synthetic case reports;
determining, from the success rate curve, a threshold number of reported incidents necessary to identify the portable product to a predetermined certainty;
receiving one or more incident reports;
when a count of the one or more incident reports is less than the threshold number, providing an indication that additional incident reports are required; and
when the count is equal to or greater than the threshold number, providing an indication that the portable product is likely the cause of the one or more incident reports.

2. The method of claim 1, wherein the one or more incident reports are received in real-time.

3. The method of claim 1, wherein the ranked list of portable products is determined by maximum-likelihood estimation.

4. The method of claim 1, wherein the portable product is selected from the group consisting of: food products; pharmaceuticals; medical devices; cosmetics; personal care products; food handling products; and pet care products.

5. The method of claim 1, wherein the one or more incident reports comprise medical reports or laboratory reports.

6. The method of claim 1, wherein the data further comprises times associated with the locations of the consumers, the probability density map is associated with a predetermined period of time, and determining the probability density map further comprises:
determining a subset of the data corresponding to the predetermined period of time.

7. The method of claim 1, wherein at least one of the plurality of simulated failures is selected from the group consisting of: a failure in a store, a failure at a retailer, and a failure at a distributor.

8. A method comprising:
receiving from a data store data regarding locations of sales of a portable product within a geographic region;
determining the locations of consumers of a portable product within a geographic region based on the locations of sales;
determining a probability density map from the data regarding the locations of consumers, the probability density map indicating where the portable product is likely to be consumed within the geographical region, wherein each point of the map indicates a probability that the portable product is being consumed at that location during a predetermined window of time;
generating a plurality of simulated failures of the portable product based on the probability density map, each simulated failure occurring within a supply chain of the portable product, each failure comprising spoilage or contamination;
for each of the plurality of simulated failures of the portable product, applying a simulator to determining locations of a plurality of simulated incidents arising from each simulated failure, each incident comprising an illness or an injury;
generating, from the locations of the plurality of simulated incidents and the probability density map, a plurality of geocoded synthetic case reports;
determining, for each of the plurality of geocoded synthetic case reports, a ranked list of potential portable products likely to have caused each respective synthetic case report;
comparing a highest ranked potential portable product in each ranked list to the portable product for which the plurality of simulated failures was generated;
when the highest-ranked portable product in a respective ranked list is the same as the portable product, incrementing a counter;
determining a success rate curve based on the counter and the plurality of synthetic case reports;
determining, from the success rate curve, a threshold number of reported incidents necessary to identify the portable product to a predetermined certainty;
receiving one or more incident reports;
when a count of the one or more incident reports is less than the threshold number, providing an indication that additional incident reports are required; and
when the count is equal to or greater than the threshold number, providing an indication that the portable product is likely the cause of the one or more incident reports.

9. The method of claim 8, ranked list of portable products is determined by maximum-likelihood estimation.

10. The method of claim 8, wherein the locations of sales are determined by applying a gravity model.

11. The method of claim 10, wherein the gravity model is a Huff gravity model.

12. A computer program product for proactive simulation of outbreaks, the computer program product comprising a non-transitory computer readable storage medium having program instructions embodied therewith, the program instructions executable by a processor to cause the processor to perform a method comprising:
receiving from a data store data regarding locations of consumers of a portable product within a geographic region;
determining a probability density map from the data regarding the locations of consumers, the probability density map indicating where the portable product is likely to be consumed within the geographical region, wherein each point of the map indicates a probability that the portable product is being consumed at that location during a predetermined window of time;
generating a plurality of simulated failures of the portable product based on the probability density map, each simulated failure occurring within a supply chain of the portable product, each failure comprising spoilage or contamination;
for each of the plurality of simulated failures of the portable product, applying a simulator to determining locations of a plurality of simulated incidents arising from each simulated failure, each incident comprising an illness or an injury;
generating, from the locations of the plurality of simulated incidents and the probability density map, a plurality of geocoded synthetic case reports;

determining, for each of the plurality of geocoded synthetic case reports, a ranked list of potential portable products likely to have caused each respective synthetic case report;

comparing a highest ranked potential portable product in each ranked list to the portable product for which the plurality of simulated failures was generated;

when the highest-ranked portable product in a respective ranked list is the same as the portable product, incrementing a counter;

determining a success rate curve based on the counter and the plurality of synthetic case reports;

determining, from the success rate curve, a threshold number of reported incidents necessary to identify the portable product to a predetermined certainty;

receiving one or more incident reports;

when a count of the one or more incident reports is less than the threshold number, providing an indication that additional incident reports are required; and when the count is equal to or greater than the threshold number, providing an indication that the portable product is likely the cause of the one or more incident reports.

* * * * *

UNITED STATES PATENT AND TRADEMARK OFFICE
CERTIFICATE OF CORRECTION

Page 1 of 1

| | |
|---|---|
| PATENT NO. | : 10,607,174 B2 |
| APPLICATION NO. | : 13/914039 |
| DATED | : March 31, 2020 |
| INVENTOR(S) | : Matthew Aaron Davis et al. |

It is certified that error appears in the above-identified patent and that said Letters Patent is hereby corrected as shown below:

On the Title Page

Item (72) The third inventor should be listed as Kun Hu, San Jose, CA (US).

Signed and Sealed this
Fourteenth Day of January, 2025

Derrick Brent
*Acting Director of the United States Patent and Trademark Office*